US 7,623,863 B2

(12) United States Patent
Chen et al.

(10) Patent No.: US 7,623,863 B2
(45) Date of Patent: Nov. 24, 2009

(54) SYSTEM AND METHOD FOR ADJUSTING CONNECTION PARAMETERS IN A WIRELESS NETWORK

(75) Inventors: Wei-Peng Chen, Santa Clara, CA (US); Chenxi Zhu, Gaithersburg, MD (US); Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 11/627,759

(22) Filed: Jan. 26, 2007

(65) Prior Publication Data

US 2008/0045215 A1 Feb. 21, 2008

Related U.S. Application Data

(60) Provisional application No. 60/822,861, filed on Aug. 18, 2006.

(51) Int. Cl.
  *H04W 36/00* (2006.01)
(52) U.S. Cl. .................. 455/436; 455/434; 455/437; 455/438; 455/439; 455/11.1; 370/328; 370/329; 370/331; 370/332; 370/333
(58) Field of Classification Search .............. 455/7, 455/8, 9, 10, 11.1, 67.13, 69, 436–444, 450, 455/451, 452.1, 452.2, 453, 522, 434, 515, 455/516, 517, 13.1; 370/328, 329, 330, 331, 370/332, 333, 343, 351, 334, 338, 441
See application file for complete search history.

(56) References Cited

U.S. PATENT DOCUMENTS

| 4,736,453 | A | | 4/1988 | Schloemer | 455/33 |
|---|---|---|---|---|---|
| 5,883,884 | A | * | 3/1999 | Atkinson | 370/279 |
| 6,718,158 | B1 | * | 4/2004 | Suonvieri | 455/9 |
| 7,349,665 | B1 | * | 3/2008 | Zhu et al. | 455/11.1 |
| 2004/0203814 | A1 | | 10/2004 | Ho et al. | 455/450 |
| 2004/0242158 | A1 | | 12/2004 | Fattouch et al. | 455/63.1 |
| 2005/0014464 | A1 | * | 1/2005 | Larsson | 455/11.1 |
| 2005/0250499 | A1 | * | 11/2005 | Lee et al. | 455/437 |
| 2006/0030309 | A1 | * | 2/2006 | Lee et al. | 455/422.1 |
| 2006/0068823 | A1 | * | 3/2006 | Kwon et al. | 455/517 |
| 2006/0121903 | A1 | * | 6/2006 | Lee et al. | 455/439 |
| 2006/0166618 | A1 | * | 7/2006 | Bakaimis | 455/11.1 |
| 2006/0193280 | A1 | | 8/2006 | Lee et al. | 370/315 |
| 2007/0037576 | A1 | * | 2/2007 | Subramanian et al. | 455/436 |
| 2007/0047569 | A1 | | 3/2007 | Das et al. | 370/443 |

(Continued)

OTHER PUBLICATIONS

Jain, et al., *Impact of Interference on Multi-hop Wireless Network Performance*, downloaded from http://research.microsoft.com/mesh/paper/interference.pdf (14 pages).

(Continued)

*Primary Examiner*—Charles N Appiah
*Assistant Examiner*—Olumide T Ajibade Akonai
(74) *Attorney, Agent, or Firm*—Baker Botts L.L.P.

(57) ABSTRACT

A method for adjusting connection parameters in a wireless network includes establishing a first wireless connection with a base station using a first channel and establishing a second wireless connection with an endpoint using a second channel. The method also includes receiving via the first wireless connection using the first channel a modification request message from the base station requesting a modification of at least one parameter of the second wireless connection with the endpoint using the second channel. The method further includes notifying the endpoint that at least one parameter of the second wireless connection using the second channel will be modified. In addition, the method includes modifying the second wireless connection using the second channel to comprise the modified at least one parameter of the second wireless connection using the second channel.

33 Claims, 2 Drawing Sheets

U.S. PATENT DOCUMENTS

| | | | | |
|---|---|---|---|---|
| 2007/0066241 | A1* | 3/2007 | Hart | 455/69 |
| 2007/0160020 | A1 | 7/2007 | Osann | 370/338 |
| 2007/0177545 | A1* | 8/2007 | Natarajan et al. | 370/331 |
| 2007/0249347 | A1* | 10/2007 | Saifullah et al. | 455/436 |
| 2007/0270118 | A1* | 11/2007 | Subramanian et al. | 455/343.2 |
| 2008/0009243 | A1* | 1/2008 | Hart | 455/67.13 |
| 2008/0031197 | A1 | 2/2008 | Wang et al. | 370/331 |
| 2008/0043668 | A1 | 2/2008 | Chen et al. | 370/329 |
| 2008/0045139 | A1 | 2/2008 | Chen et al. | 455/3.04 |

OTHER PUBLICATIONS

IEEE 802.16 Presentation Submission Template (Rev. 8.3), downloaded from http://grouper.ieee.org/groups/802/16/relay/contrib/C80216j-06_004r1.pdf (14 pages).

*Industrial Technology Research Institute*, 802.16j MMR Mobile Multi-Hop Relay, tmlin@itri.org.tw (21 pages), Jun. 1, 2006.

Letter from Paul Nikolich to Jodi Haasz at International Stds Programs and Governance re *P802.16j—Amendment to IEEE Standard for Local and Metropolitan Area Networks*—Part 16: Air Interface for Fixed and Mobile Broadband Wireless Access Systems—Multihop Relay Specification (4 pages), Mar. 31, 2006.

Puthenkulam, et al., 802.16e: A Mobile Broadband Wireless Standard, *Mobility Group*, Copyright © 2005 Intel Corporation (29 pages), 2005.

IEEE 802 Tutorial: 802.16 Mobile Multihop Relay, *IEEE WirelessMAN 802.16*, (73 pages), Mar. 6, 2006.

IEEE Standard for Local and Metropolitan area networks, Part 16: Air Interface for Fixed and Mobile Broadband Wireless Access Systems, Amendment 2, and Corrigendum 1 *IEEE* Copyright © 2006 IEEE. (822 pages), 2006.

U.S. Patent communication mailed Sep. 29, 2009 regarding U.S. Appl. No. 11/557,428 filed Nov. 7, 2006.

Kipo's Notice of Preliminary Rejection (English translation) mailed Feb. 18, 2009 in re Korean Patent Application 10-2007-77445 (4 pages).

Kipo's Notice of Preliminary Rejection (English translation) mailed Feb. 20, 2009 in re Korean Patent Application 10-2007-78631 (4 pages).

Wei-Peng Chen et al., U.S. Appl. No. 11/557,428 filed Nov. 7, 2006, Communication from the United States Patent and Trademark Office dated Apr. 17, 2009.

\* cited by examiner

SYSTEM AND METHOD FOR ADJUSTING CONNECTION PARAMETERS IN A WIRELESS NETWORK

RELATED APPLICATIONS

This application claims priority to U.S. Patent Application Ser. No. 60/822,861, entitled "MANAGING A WIRELESS NETWORK," which was filed on Aug. 18, 2006.

TECHNICAL FIELD OF THE INVENTION

This invention relates in general to communication systems and, more particularly, to a system and method for adjusting connection parameters in a wireless network.

BACKGROUND OF THE INVENTION

While broadband network services and Voice over IP (VoIP) products continue to grow and expand, so does the demand for wireless network functionality. To help meet this demand networks are being developed that use multiple base stations, relay stations, access points or points of contact. One emerging technology is 802.16, popularly known as WiMAX. WiMAX provides broadband wireless access, with a single base station providing coverage over a large area (theoretically up to 31 miles). Other wireless networking technologies include Third Generation (3G), Third Generation Partnership Project (3GPP), and 802.11, popularly known as WiFi.

An endpoint's ability to enjoy the benefits of wireless networks, such as WiMAX, depends on its ability to locate and lock onto a strong enough signal. This can often be difficult in areas where the signal from the base station encounters interference (e.g., at the edge of its range, in areas where the coverage of two bases stations overlap, within a tunnel or building). One possible solution is to increase the transmission power of the base station; another solution is to install additional base stations. However, this may not be desirable because of the increased operating costs and the limited access to backhaul links. Another solution is 802.16j which is being developed by the 802.16j Relay Working Group as part of the 802.16 standard. 802.16j provides a way to implement relay stations that may increase the service area and/or throughput abilities of a WiMAX base station. The relay stations do not need a backhaul link because they communicate wirelessly with both base stations and endpoints. This type of network may be referred to as a multihop network because there may be more than one wireless connection between the endpoint and a hardwired connection.

As may be apparent, communicating wirelessly with both base stations and endpoints increases the amount of data that the relay station must communicate. More specifically, the relay station both receives and then transmits the same data between the endpoint and the base station using wireless connections. A relay station within the wireless network may often only use a single channel to provide its communication needs with both the endpoints and the other relay stations and base stations. The capacity of this channel is finite and in some situations may be insufficient to support the traffic demands within a particular relay station's cell.

SUMMARY

Particular embodiments provide a system and method for adjusting connection parameters in a wireless network that substantially eliminates or reduces at least some of the disadvantages and problems associated with previous methods and systems.

In accordance with a particular embodiment, a method for adjusting connection parameters in a wireless network includes establishing a first wireless connection with a base station using a first channel and establishing a second wireless connection with an endpoint using a second channel. The method also includes receiving via the first wireless connection using the first channel a modification request message from the base station requesting a modification of at least one parameter of the second wireless connection with the endpoint using the second channel. The method further includes notifying the endpoint that at least one parameter of the second wireless connection using the second channel will be modified. In addition, the method includes modifying the second wireless connection using the second channel to comprise the modified at least one parameter of the second wireless connection using the second channel.

In particular embodiments, the method may also include sending the base station an affirmative response indicating the requested modification will be made to the at least one parameter of the second wireless connection using the second channel. The method may further include receiving from the base station an updated identity message comprising a new identity and the modified at least one parameter of the second wireless connection using the second channel. The method may also include forwarding to the endpoint the updated identity message and sending to the endpoint a handover request message. The handover request message may request that the endpoint use the modified second wireless connection. In addition the method may include using the new identity in establishing a connection with the endpoint via the modified second wireless connection using the second channel.

In accordance with another embodiment, a method for adjusting connection parameters in a wireless network includes establishing a first wireless connection with a relay station using a first channel, the relay station having established a second wireless connection with an endpoint using a second channel. The method also includes identifying a modification trigger for at least one parameter of the second wireless connection using the second channel. The method further includes sending a modification request message to the relay station via the first wireless connection using the first channel requesting that the relay station modify the second wireless connection using the second channel to comprise the at least one modified parameter of the second wireless connection using the second channel.

In particular embodiments the relay station may be associated with a first identity. The method may also include, upon receiving an affirmative response indicating the requested modification will be made to the at least one parameter of the second wireless connection using the second channel, creating a second identity for the relay station and broadcasting an updated identity message comprising the second identity for the relay station and the at least one modified parameter of the second wireless connection using the second channel.

In accordance with another embodiment, a system for adjusting connection parameters in a wireless network includes an interface operable to establish a first wireless connection with a base station using a first channel and to establish a second wireless connection with an endpoint using a second channel. The interface is also operable to receive via the first wireless connection using the first channel a modification request message from the base station requesting a modification of at least one parameter of the second wireless connection with the endpoint using the second channel. The interface is further operable to notify the endpoint that at least one parameter of the second wireless connection using the second channel will be modified. The system also includes a processor coupled to the interface and operable to modify the second wireless connection using the second channel to comprise the modified at least one parameter of the second wireless connection using the second channel.

In accordance with another embodiment of the present invention, a system for adjusting connection parameters in a wireless network includes an interface operable to establish a first wireless connection with a relay station using a first channel, the relay station having established a second wireless connection with an endpoint using a second channel. The system also includes a processor coupled to the interface and operable to identify a modification trigger for at least one parameter of the second wireless connection using the second channel. The interface is further operable to send a modification request message to the relay station via the first wireless connection using the first channel requesting that the relay station modify the second wireless connection using the second channel to comprise the at least one modified parameter of the second wireless connection using the second channel.

Technical advantages of particular embodiments include allowing a base station to dynamically change the parameters of a wireless connection between an endpoint and a relay station without having to alter the way the endpoint communicates data. Accordingly, a wireless network may be upgraded to allow dynamic adjusting of a wireless connection's parameters without having to upgrade any of the endpoints. Allowing a base station to dynamically adjust the parameters of a wireless connection also may provide more flexibility in the allocation of wireless resources.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
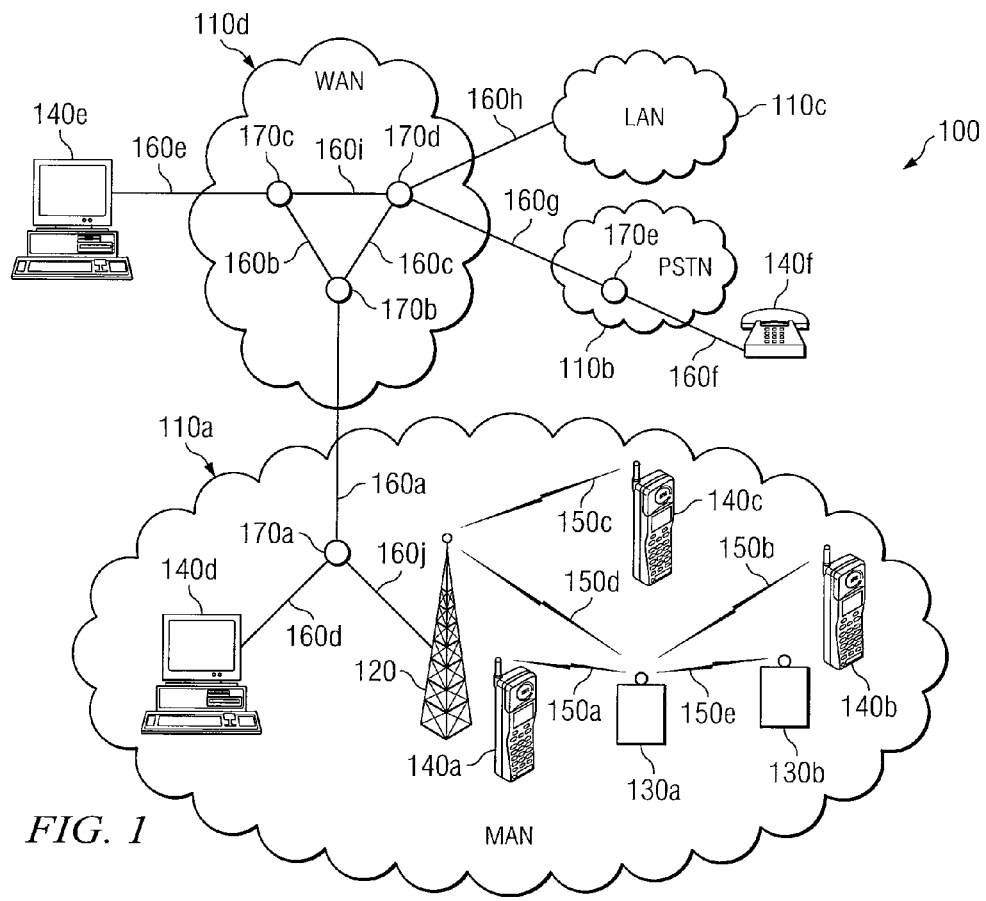
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multihop relay (MMR) network.

In particular embodiments, base station 120 may be able to dynamically change the parameters of wireless connections 150. More specifically, as traffic demands of endpoints 140a-140d fluctuate, base station 120 may adjust the frequency, frame duration and/or bandwidth of the respective wireless connections to promote a more efficient use of wireless resources. The ability to adjust the parameters of wireless connection 150 as needs or circumstances change may allow greater flexibility in allocating wireless resources and may provide for dynamic resource reuse. In particular embodiments, the parameters of wireless connections 150 may be adjusted without requiring special endpoints. More specifically, the ability to change parameters of wireless connections 150 may not involve changes to the way in which endpoints communicate with relay stations or base stations.

Although communication system 100 includes four networks 110a-110d, the term "network" should be interpreted as generally defining any network capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wireline networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a is a MAN that may be implemented, at least in part, via WiMAX, network 110b is a PSTN, network 110c is a LAN, and network 110d is a WAN.

Networks 110a, 110c and 110d may be IP networks. IP networks transmit data by placing the data in packets and sending each packet individually to the selected destination, along one or more communication paths. Network 110b is a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110d to be able to communicate with non-PSTN networks such as networks 110a, 110c and 110d.

Any of networks 110a, 110c and/or 110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a, 110c and/or 110d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

Wireless connections 150 may represent a wireless connection between two components using, for example, WiMAX. The extended range of a WiMAX base station and/or relay station may allow network 110a to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160a, communicate with other base stations, network components not capable of establishing a wireless connection, and/or other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a may comprise another base station that is wired to base station 120 via link 160j and to network 110d via link 160a. As a base station, node 170a may be able to establish several wireless connections with various other base stations, relay stations, and/or endpoints. As another example, node 170e may comprise a gateway. This may allow network 110b, a PSTN network, to be able to transmit and receive communications from other non-PSTN networks, such as network 110d, an IP network. Node 170e, as a gateway, works to translate communications between the various protocols used by different networks.

Endpoints 140 and/or nodes 170 may comprise any combination of hardware, software, and/or encoded logic that provides data or network services to a user. For example, endpoints 140a-140c may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
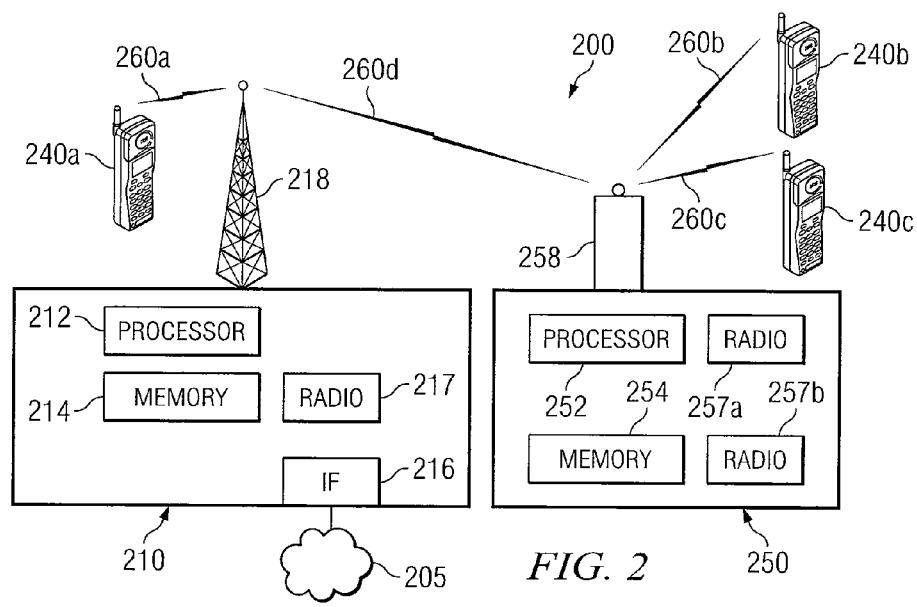
FIG. 2 illustrates a wireless network comprising a more detailed view of a base station and a relay station, in accordance with a particular embodiment.

FIG. 2 illustrates a wireless network 200 comprising a more detailed view of base station 210 and relay station 250, in accordance with a particular embodiment. In different embodiments network 200 may comprise any number of wired or wireless networks, base stations, endpoints, relay stations, and/or any other components that may facilitate or participate in the communication of data and/or signals whether via wired or wireless connections. For simplicity, network 200 comprises network 205, base station 210, endpoints 240 and relay station 250. Base station 210 comprises processor 212, memory module 214, interface 216, radio 217 and antenna 218. Similarly, relay station 250 comprises processor 252, memory module 254, radios 257 and antenna 258. These components may work together in order to provide base station and/or relay station functionality, such as providing wireless connections in a wireless network (e.g., a WiMAX wireless network). Network 205 may comprise one or more of the networks described above with respect to FIG. 1.

Processor 212 may be a microprocessor, controller, or any other suitable computing device, resource, or combination of hardware, software and/or encoded logic operable to provide, either alone or in conjunction with other base station 210 components, such as memory module 214, base station 210 functionality. Such functionality may include providing various wireless features discussed herein to an endpoint or relay station, such as endpoint 240a or relay station 250. Processor 212 may be used in determining when and how the parameters of a particular wireless connection should be modified.

Memory module 214 may be any form of volatile or non-volatile memory including, without limitation, magnetic media, optical media, random access memory (RAM), read-only memory (ROM), removable media, or any other suitable local or remote memory component. Memory module 214 may store any suitable data or information, including software and encoded logic, utilized by base station 210. In some embodiments memory module 214 may store information related to the various wireless connections associated either directly (e.g., endpoint 240a) or indirectly (e.g., endpoints 240b and 240c) with base station 210. Memory module 214 may also maintain a list, database, or other organization of data useful for determining how to route data to the proper endpoints and/or relay stations. For example, in some embodiments a tree structure (as opposed to a mesh structure) may be used in routing data from an endpoint to a base station. More specifically, there may be a known path from base station 210 to endpoint 240b. This path, or a portion thereof, may be stored in memory module 214.

Base station 210 also comprises interface 216 which may be used in the wired communication of signaling and/or data between base station 210 and network 205. For example, interface 216 may perform any formatting or translating that may be needed to allow base station 210 to send and receive data from network 205 over a wired connection.

Radio 217 may be coupled to or a part of antenna 218. Radio 217 may receive digital data that is to be sent out to other base stations, relay stations and/or endpoints via a wireless connection. Radio 217 may convert the digital data into a radio signal having the appropriate channel and bandwidth parameters. These parameters may have been determined ahead of time by some combination of processor 212 and memory module 214. The radio signal may then be transmitted via antenna 218 to the appropriate recipient (e.g., relay station 250).

Antenna 218 may be any type of antenna capable of transmitting and receiving data and/or signals wirelessly. In some embodiments, antenna 218 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Relay station 250 comprises components similar to those of base station 210. One exception may be that in some embodiments relay station 250 may not include an interface for a wired connection. This may be because relay station 250 may only use wireless connections, and thus does not need a wired connection. By allowing relay station 250 to be deployed without a wired connection, the initial deployment cost may be lower because network wires do not have to be run out to each relay station.

Like base station 210, relay station 250 comprises a processor. Processor 252 may be a microprocessor, controller, or any other suitable computing device, resource, or combination of hardware, software and/or encoded logic operable to provide, either alone or in combination with other relay station 250 components, such as memory module 254, relay station 250 functionality. Such functionality may include providing various wireless features discussed herein to an endpoint or base station, such as endpoints 240b, 240c or base station 210. Processor 252 may be used in determining whether relay station 250 will comply with a requested change in a wireless connection received from base station 210. If processor 252 determines to comply with base station 210's request, processor 252 may also be used in configuring radio 257b to conform with the connection parameters supplied by base station 210.

Memory module 254 may be any form of volatile or non-volatile memory including, without limitation, magnetic media, optical media, random access memory (RAM), read-only memory (ROM), removable media, or any other suitable local or remote memory component. Memory module 254 may store any suitable data or information, including software and encoded logic, utilized by relay station 250. In some embodiments memory module 254 may store such information as a name or identity associated with relay station 250 and/or the center frequencies, frame durations and bandwidths of the wireless connections associated with relay station 250 (e.g., wireless connections 260b and 260c). Memory module 254 may also maintain a list, database, or other organization of data useful for determining how to route data to the proper endpoints, base stations and/or relay stations.

Radios 257 may be coupled to or a part of antenna 258. Radios 257 may receive digital data from, for example, processor 252 that is to be sent out to other base stations, relay stations and/or endpoints via a wireless connection. Each radio 257 may have its own channel associated therewith. The channel may be used by one or more wireless connections. The characteristics of the channel (e.g., frequency and bandwidth) may be used in determining the number, frequency and size of each wireless connection. The parameters of the wireless connections may, in turn, be used when converting digital data into radio signals having the appropriate frequency, and bandwidth. These parameters may have been determined ahead of time by base station 210 or processor 252. The radio signal from each radio may then be transmitted via antenna 258 to the appropriate recipient (e.g., base station 210).

Not only may the two radios of relay station 250 be assigned different channels as discussed above, but they may be different types of radios. More specifically, radio 257a may be an endpoint style radio used to communicate with base station 210, and radio 257b may be a base station style radio used to communicate with endpoints 240b and 240c. Thus from the perspective of endpoints 240 relay station 250 may appear to be a base station, and from the perspective of base station 210 relay station 250 may appear to be an endpoint. This may allow a wireless network to incorporate a relay station without having to change the way endpoints transmit or receive data.

Antenna 258 may be any type of antenna capable of transmitting and receiving data and/or signals wirelessly. In some embodiments, antenna 258 may comprise one or more omni-directional, sector or panel antennas operable to transmit/receive radio signals between 2 GHz and 66 GHz.

Endpoints 240 may be any type of wireless endpoints able to send and receive data and/or signals to and from base station 210 or relay station 250. Some possible types of endpoints 240 may include desktop computers, PDAs, cell phones, laptops, and/or VoIP phones.

To better understand how the various components of base station 210 and relay station 250 work to provide the functionality of particular embodiments, the components of the illustrated embodiment will be discussed in the context of an example. For purposes of this example it will be assumed that endpoints 240b and 240c have established wireless connections 260b and 260c, respectively, with relay station 250. As time passes, the amount of data communicated via wireless connections 260b and 260c may vary. This information may be sent to base station 210 via wireless connection 260d or it may be determined by base station 210 using, for example, processor 212.

Base station 210 may use memory 214 to store the information regarding the amount of data communicated over wireless connections 260a-260d. The information may include average data rates based on individual endpoints, average data rates based on the type of service being used, or any other type of data rates that may be desired. Processor 212 may use this information to determine when and how the frequency and/or bandwidth of a particular wireless connection should be changed. For purposes of this example, assume that endpoint 240b has recently established wireless connection 260b with relay station 250. The additional endpoint may have increased the amount of data being sent via wireless connections 260b and 260c. Base station 210 may become aware of this and may use processor 212 and memory 214 to determine that some, or all, of the parameters of wireless connections 260b and 260c need to be changed. Processor 212 and memory 214 may also be used to determine how the parameters of wireless connections 260b and 260c should be modified. Base station 210 may further determine if the change to wireless connections 260b and 260c will affect any of the other wireless connections 260, and if so what changes need to be made to them in order to accommodate the change to wireless connections 260b and 260c.

The recently determined new parameters of wireless connections 260b and 260c may be included in a modification request message sent to relay station 250 requesting that relay station 250 change wireless connections 260b and 260c in accordance with the determined parameters. The change request message may include the determined center frequency and bandwidth of wireless connections 260b and 260c, a proposed time to wait for a final announcement from base station 210, and a new name or identity for relay station 250 (e.g., a new relay station ID (RSID)). In particular embodiments, the change request message may comprise a frequency and bandwidth change request (FBC-REQ). Once the FBC-REQ has been sent, base station 210 may begin a FBC response (FBC-RSP) timer while it waits for a response (e.g., a FBC-RSP) from relay station 250. If no response comes before the FBC-RSP timer times-out, or if the response is a negative response (e.g., rejects the requested change) or is defective, then the attempt to change the parameters of wireless connections 260b and 260c may be aborted.

Relay station 250 may receive the FBC-REQ via antenna 258. Radio 257a may convert the FBC-REQ into digital data for processor 252 to evaluate to determine if it is able to comply with the requested change to wireless connections 260b and 260c. If processor 252 determines that relay station 250 will not be able to comply with the requested change it may ignore the request (e.g., not send a response) or send a negative response (e.g., a response rejecting the FBC-REQ). On the other hand, if relay station 250 is able to comply with the FBC-REQ it may send base station 210 an affirmative response, such as a FBC-RSP indicating that it is able to comply with the requested change to wireless connections 260b and 260c. After sending the FBC-RSP, relay station 250 may start a mobility neighborhood advertisement (MOB_NBR-ADV) timer indicating the amount of time relay station 250 may wait for a response from base station 210. If the MOB_NBR-ADV timer times-out before receiving a MOB_NBR-ADV containing new information from base station 210, relay station 250 may send another FBC-RSP. The number of times relay station 250 may attempt to send a FBC-RSP may vary depending on the operational needs of the embodiment. Once that number of sent FBC-RSP has been exceeded, or the MOB_NBR-ADV from base station 210 indicates that there will not be a change or it is defective, then relay station 250 may abort the attempt to change the parameters of wireless connections 260b and 260c. In some embodiments, the FBC-RSP may include a confirmation code with different numbers indicating different results. For example, a confirmation code of 0 may indicate a positive response, a confirmation code of 2 may indicate the FBC-REQ is rejected as being a non-supported parameter, and a confirmation code of 7 may indicate this FBC-RSP is a retransmission of a previous FBC-RSP.

Base station 210 may receive the FBC-RSP through antenna 218. Radio 217 may present processor 212 with the FBC-RSP in digital form so that processor 212 may process the message. The FBC-RSP may alert base station 210 that relay station 250 is able to comply with the FBC-REQ. Base station 210 may then include the determined parameters in the next broadcasted MOB_NBR-ADV message. The MOB_NBR-ADV is an advertisement periodically broadcasted by base station 210 and includes certain information concerning any base stations and/or relay stations within base station 210's neighborhood (e.g., relay station 250). The MOB_NBR-ADV may be broadcast to endpoints, relay stations and base stations. The MOB_NBR-ADV may include information concerning the center frequency and bandwidth that wireless connection 260b is to use, the new name or identity for relay station 250, and when relay station 250 should begin to use the new parameters for wireless connections 260b and 260c. The receipt of the MOB_NBR-ADV comprising information pertaining to a new identity for relay station 250 may alert relay station 250 that it should proceed with the changes to wireless connections 260b and 260c. Because relay station 250 may have a new identity, it may be viewed as a new relay station.

Upon receiving the MOB_NBR-ADV message, relay station 250 may forward the message to endpoints 240b and 240c. It should be noted that in some embodiments relay station 250 may change the MOB_NBR-ADV message before sending it to endpoints 240b and 240c and in some embodiments the message may simply be repeated without any manipulation. The MOB_NBR-ADV lets endpoints 240b and 240c know that there is a new relay station and what the relevant information is concerning the new relay station. More specifically, when endpoints 240b and 240c receive the MOB_NBR-ADV, it will appear, from their perspective, that there is a new relay station comprising information as detailed in the MOB_NBR-ADV message. Relay station 250 may also process the MOB_NBR-ADV message and, upon determining that the MOB_NBR-ADV contains new information directed to relay station 250, relay station 250 may start a change timer. The change timer may be set based on information provided by base station 210 (e.g., information within the FBC request). Once the change timer times-out, relay station 250 may begin its transition into the new relay station and use the new parameters for wireless connections 260b and 260c.

Between the time when relay station 250 receives the MOB_NBR-ADV and when the second timer times-out, relay station 250 may broadcast a hand-off message (e.g., a mobility base station hand over request (MOB_BSHO-REQ)) informing endpoints 240b and 240c that they are to be handed over to the new relay station 250. Endpoints 240b and 240c may then send a handoff acknowledgement (e.g., a mobility base station hand over indication (MOB_BSHO-IND)). After sending the acknowledgement, relay station 250 and endpoints 240b and 240c may begin to adjust their radios (e.g., change frequency and/or bandwidth) to use the new wireless connections 260b and 260c. Once the radios have been adjusted, both endpoints 240b and 240c may reconnect with relay station 250. The latency associated with reconnecting to relay station 250 may be reduced because endpoints 240b and 240c have previously received the MOB_NBR-ADV and MOB_BSHO-REQ messages and because the new and old base station are the same physical device. More specifically, handover optimization information may be carried in MOB_BSHO-REQ messages such that end points 240b and 240c may skip some network entry processes and reduce connection time to relay station 250.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations providing the necessary coverage. Furthermore, in some embodiments, relay station 250 may have more or less radios.

Figure 3:
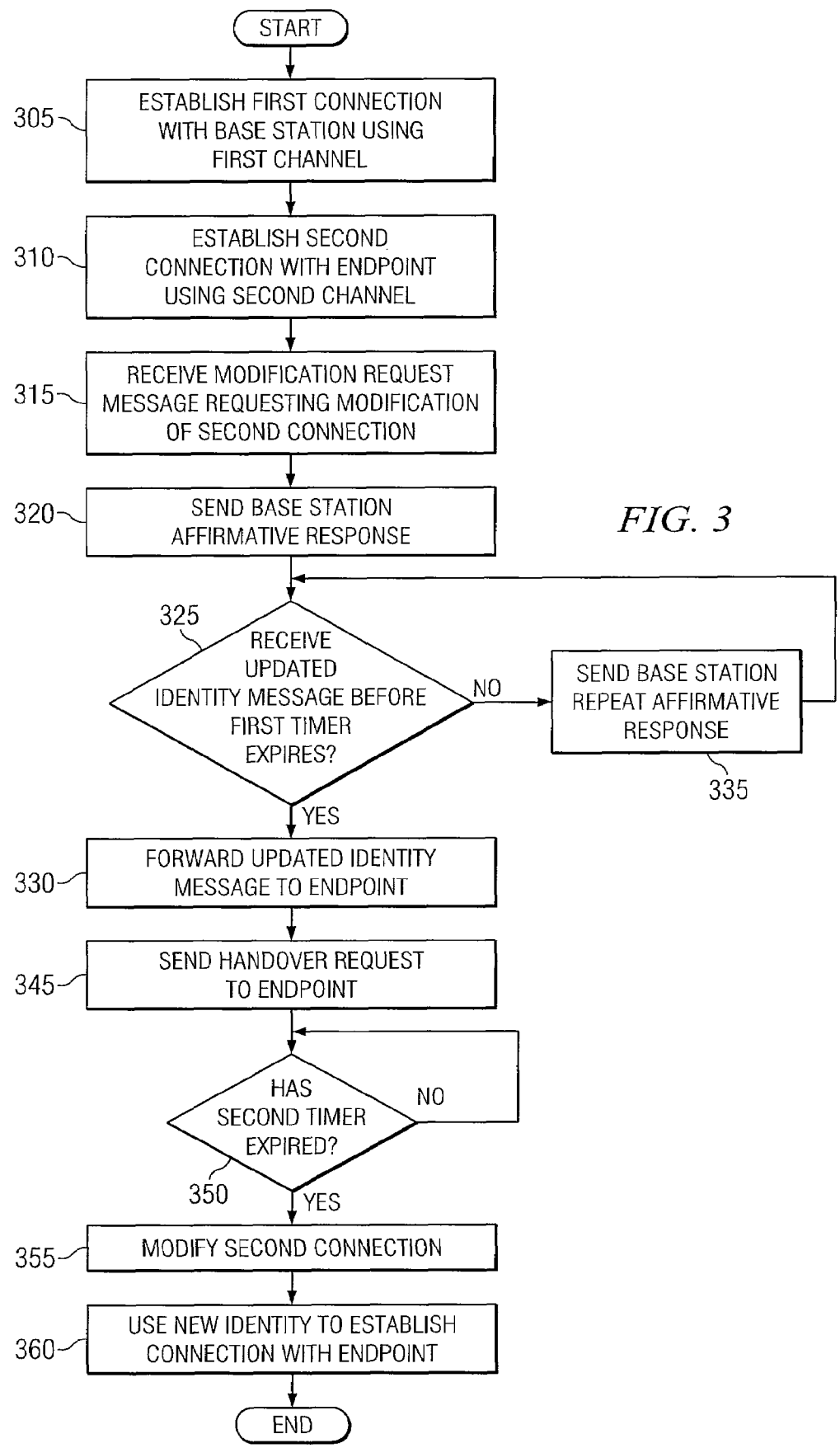
FIG. 3 illustrates a method for adjusting connection parameters in a wireless network, in accordance with a particular embodiment.

FIG. 3 illustrates a method for adjusting connection parameters in a wireless network, in accordance with a particular embodiment. The illustrated method allows, among other things, for a base station to dynamically change the parameters of a wireless connection. The method begins at steps 305 and 310 where the relay station establishes a first wireless connection with a base station and a second wireless connection with an endpoint. The relay station may establish wireless connections with more than one endpoint, but for simplicity this method will focus on just the one endpoint.

At some point the base station may determine that one of the parameters of the second wireless connection needs to be changed. For example, additional endpoints may have recently established wireless connections with the base station, or the endpoint may be experiencing interference from another nearby wireless component. Regardless of the reason, once the base station determines that one or more of the parameters of the second wireless connection needs to be changed it may send a modification request message. At step 315 the relay station receives the modification request message. In some embodiments the modification request may be a frequency and bandwidth change request (FBC-REQ).

Upon receiving the modification request the relay station may evaluate all the wireless connections associated therewith as well as any other parameters or variables to determine if it can comply with the modification request. If the relay station determines it is able to comply with the modification request it will send the base station an affirmative response at step 320. In some embodiments the affirmative response may comprise a FBC response (FBC-RSP). If the relay station sends a negative response the attempt to modify the parameters of the second wireless connection may be aborted.

When the base station receives the response it knows that the relay station is able to comply with the modification request and will then send an updated identity message. In particular embodiments the updated identity message may comprise a mobility neighbor advertisement (MOB_NBR-ADV) which may be broadcast by the base station. The MOB_NBR-ADV may let any wireless components coupled to the base station (either directly or indirectly) know the identity and parameters of the other relay stations and base stations. This message may include a new identity for the relay station, the new identity may be used by the relay station when establishing the new connection with the endpoint using the new parameters (step 360 below) which may also be included in the updated identity message.

After the relay station sends its response, it may start a first timer while it waits to receive the updated identity message. If the timer times out before the relay station receives the updated identity message, the relay station will, at step 335, send another affirmative response. In some embodiments this may be the same as the affirmative response sent at step 320. In particular embodiments the affirmative response sent at step 335 may include a field indicating that this is a repeated affirmative response (e.g., a confirmation code in the FBC-RSP may be set to 7 to indicate it is sent because the first timer timed out). On the other hand, if the relay station receives the updated identity message it may forward the message to the endpoint at step 330.

At step 345 the relay station may send the endpoint a handover request. In some embodiments the handover request may comprise a mobility base station handover request (MOB_BSHO-REQ). The handover may involve handing the endpoint from the relay station using its original identity and channel parameters to the same relay station using the new identity and channel parameters contained in the updated identity message. The endpoint may respond to the handover request with a response, such as a MOB_BSHO indication (MOB_NBR-IND) indicating it received the handover request.

At step 350 the relay station may wait for the second timer to expire. In some embodiments the second timer may have been started at step 325 when the relay station received the updated identity message. If the timer has not expired the relay station may remain at step 350 until the timer does expire. This may provide the endpoint with sufficient time to prepare for the handover.

Then at step 355, once the second timer has expired, the relay station may reconfigure itself so that it is able to communicate with the endpoint using the new channel parameters provided by the base station. Then at step 360 the endpoint and relay station are reconnected using the new identity and channel parameters of the relay station.

Some of the steps illustrated in FIG. 3 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for adjusting connection parameters in a wireless network, comprising:
 establishing a first wireless connection with a base station using a first channel;
 establishing a second wireless connection with an endpoint using a second channel;
 receiving via the first wireless connection a modification request message from the base station requesting a modification of at least one parameter of the second wireless connection with the endpoint;
 notifying the endpoint that at least one parameter of the second wireless connection will be modified;
 sending the base station an affirmative response indicating the requested modification will be made to the at least one parameter of the second wireless connection;
 modifying the second wireless connection to comprise the modified at least one parameter of the second wireless connection;
 receiving from the base station an updated identity message comprising a new identity and the modified at least one parameter of the second wireless connection;
 forwarding to the endpoint the updated identity message;
 sending to the endpoint a handover request message, the handover request message requesting that the endpoint use the modified second wireless connection; and
 using the new identity in establishing a connection with the endpoint via the modified second wireless connection.

2. The method of claim 1, further comprising:
 starting a first timer; and
 upon the first timer expiring before receiving the updated identity message sending a repeat affirmative response to the base station indicating the requested modification will be made to the at least one parameter of the second wireless connection.

3. The method of claim 1:
further comprising starting a second timer; and
upon the second timer expiring, modifying the second wireless connection to comprise the modified at least one parameter of the second wireless connection.

4. The method of claim 1, wherein the updated identity message comprises a mobility neighborhood advertisement (MOB_NBR-ADV).

5. The method of claim 1, further comprising sending a negative response to the base station indicating the requested modification will not be made to the at least one parameter of the second wireless connection.

6. The method of claim 1, wherein the first wireless connection and the second wireless connection utilize 802.16 Worldwide Interoperability for Microwave Access (WiMAX).

7. The method of claim 1, wherein the modified at least one parameter of the second wireless connection comprises a modified center frequency of the second wireless connection.

8. The method of claim 1, wherein the modified at least one parameter of the second wireless connection comprises a modified bandwidth of the second wireless connection 9. A method for adjusting connection parameters in a wireless network, comprising:
establishing a first wireless connection with a relay station using a first channel, the relay station having established a second wireless connection with an endpoint using a second channel; wherein the relay station is associated with a first identity;
identifying a modification trigger for at least one parameter of the second wireless connection;
sending a modification request message to the relay station via the first wireless connection requesting that the relay station modify the second wireless connection to comprise the at least one modified parameter of the second wireless connection; and
upon receiving an affirmative response indicating the requested modification will be made to the at least one parameter of the second wireless connection:
creating a second identity for the relay station; and
broadcasting an updated identity message comprising the second identity for the relay station and the at least one modified parameter of the second wireless connection.

10. The method of claim 9, wherein the updated identity message comprises a mobility neighborhood advertisement (MOB_NBR-ADV).

11. The method of claim 9, wherein the first wireless connection and the second wireless connection utilize 802.16 Worldwide Interoperability for Microwave Access (WiMAX).

12. The method of claim 9, wherein the at least one modified parameter of the second wireless connection comprises a modified center frequency of the second wireless connection.

13. The method of claim 9, wherein the at least one modified parameter of the second wireless connection comprises a modified bandwidth of the second wireless connection.

14. A system for adjusting connection parameters in a wireless network, comprising:
an interface operable to:
establish a first wireless connection with a base station using a first channel;
establish a second wireless connection with an endpoint using a second channel;
receive via the first wireless connection a modification request message from the base station requesting a modification of at least one parameter of the second wireless connection with the endpoint; and
notify the endpoint that at least one parameter of the second wireless connection will be modified;
a processor coupled to the interface and operable to modify the second wireless connection to comprise the modified at least one parameter of the second wireless connection and
the interface further operable to:
send the base station an affirmative response indicating the requested modification will be made to the at least one parameter of the second wireless connection;
receive from the base station an updated identity message comprising a new identity and the modified at least one parameter of the second wireless connection;
forward to the endpoint the updated identity message;
send to the endpoint a handover request message, the handover request message requesting that the endpoint use the modified second wireless connection; and
use the new identity to establish a connection with the endpoint via the modified second wireless connection.

15. The system of claim 14, wherein:
the processor is further operable to start a first timer; and
the interface is further operable to, upon the first timer expiring before receiving the updated identity message, send a repeat affirmative response to the base station indicating the requested modification will be made to the at least one parameter of the second wireless connection.

16. The system of claim 14, wherein the processor is further operable to:
start a second timer; and
upon the second timer expiring, modify the second wireless connection to comprise the modified at least one parameter of the second wireless connection.

17. The system of claim 14, wherein the updated identity message comprises a mobility neighborhood advertisement (MOB_NBR-ADV).

18. The system of claim 14, wherein the modified at least one parameter of the second wireless connection comprises a modified center frequency of the second wireless connection.

19. The system of claim 14, wherein the modified at least one parameter of the second wireless connection comprises a modified bandwidth of the second wireless connection.

20. A system for adjusting connection parameters in a wireless network, comprising:
an interface operable to establish a first wireless connection with a relay station using a first channel, the relay station comprising a second wireless connection with an endpoint using a second channel, wherein the relay station is associated with a first identity;
a processor coupled to the interface and operable to identify a modification trigger for at least one parameter of the second wireless connection;
wherein the interface is further operable to send a modification request message to the relay station via the first wireless connection requesting that the relay station modify the second wireless connection to comprise the at least one modified parameter of the second wireless connection;
wherein the processor is further operable to, upon receiving an affirmative response indicating the requested modification will be made to the at least one parameter of the second wireless connection, create a second identity for the relay station; and wherein the interface is further operable to broadcast an updated identity message comprising the second identity for the relay station and the at least one modified parameter of the second wireless connection.

21. The system of claim 20, wherein the updated identity message comprises a mobility neighborhood advertisement (MOB_NBR-ADV).

22. The system of claim 20, wherein the at least one modified parameter of the second wireless connection comprises a modified center frequency of the second wireless connection.

23. The system of claim 20, wherein the at least one modified parameter of the second wireless connection comprises a modified bandwidth of the second wireless connection.

24. A computer-readable medium encoded with software, the computer-readable medium encoded with software operable when executed to:
    establish a first wireless connection with a base station using a first channel;
    establish a second wireless connection with an endpoint using a second channel;
    receive via the first wireless connection a modification request message from the base station requesting a modification of at least one parameter of the second wireless connection with the endpoint;
    notify the endpoint that at least one parameter of the second wireless connection will be modified;
    modify the second wireless connection to comprise the modified at least one parameter of the second wireless connection;
    send the base station an affirmative response indicating the requested modification will be made to the at least one parameter of the second wireless connection;
    receive from the base station an updated identity message comprising a new identity and the modified at least one parameter of the second wireless connection;
    forward to the endpoint the updated identity message;
    send to the endpoint a handover request message, the handover request message requesting that the endpoint use the modified second wireless connection; and
    use the new identity in establishing a connection with the endpoint via the modified second wireless connection.

25. The medium of claim 24, wherein the code is further operable to:
    start a first timer; and
    upon the first timer expiring before receiving the updated identity message, send a repeat affirmative response to the base station indicating the requested modification will be made to the at least one parameter of the second wireless connection.

26. The medium of claim 24, wherein the code is further operable to:
    start a second timer; and
    upon the second timer expiring, modify the second wireless connection to comprise the modified at least one parameter of the second wireless connection.

27. The medium of claim 24, wherein the updated identity message comprises a mobility neighborhood advertisement (MOB_NBR-ADV).

28. The medium of claim 24, wherein the modified at least one parameter of the second wireless connection comprises a modified center frequency of the second wireless connection.

29. The medium of claim 24, wherein the modified at least one parameter of the second wireless connection comprises a modified bandwidth of the second wireless connection.

30. A computer-readable medium encoded with software, the computer-readable medium encoded with software operable when executed to:
    establish a first wireless connection with a relay station using a first channel, the relay station having established a second wireless connection with an endpoint using a second channel, wherein the relay station is associated with a first identity;
    identify a modification trigger for at least one parameter of the second wireless connection;
    send a modification request message to the relay station via the first wireless connection requesting that the relay station modify the second wireless connection to comprise the at least one modified parameter of the second wireless connection;
    upon receiving an affirmative response indicating the requested modification will be made to the at least one parameter of the second wireless connection:
        create a second identity for the relay station; and
        broadcast an updated identity message comprising the second identity for the relay station and the at least one modified parameter of the second wireless connection.

31. The medium of claim 30, wherein the updated identity message comprises a mobility neighborhood advertisement (MOB_NBR-ADV).

32. The medium of claim 30, wherein the at least one modified parameter of the second wireless connection comprises a modified center frequency of the second wireless connection.

33. The medium of claim 30, wherein the at least one modified parameter of the second wireless connection comprises a modified bandwidth of the second wireless connection.

* * * * *